US008176902B2

(12) United States Patent
Elsässer et al.

(10) Patent No.: US 8,176,902 B2

(45) Date of Patent: May 15, 2012

(54) INTERNAL COMBUSTION ENGINE SYSTEM

(75) Inventors: Alfred Elsässer, Keltern (DE); Adam Loch, Stuttgart (DE); Boris Lerch, Stuttgart (DE)

(73) Assignee: Mahle International GmbH

( * ) Notice: Subject to any disclaimer, the term of this patent is extended or adjusted under 35 U.S.C. 154(b) by 0 days.

(21) Appl. No.: 12/545,473

(22) Filed: Aug. 21, 2009

(65) Prior Publication Data

US 2012/0000447 A1 Jan. 5, 2012

Related U.S. Application Data

(63) Continuation of application No. PCT/EP2008/052097, filed on Feb. 21, 2008.

(51) Int. Cl.
*F02B 47/08* (2006.01)
*F02B 47/10* (2006.01)

(52) U.S. Cl. .................................................. 123/568.19

(58) Field of Classification Search ............. 123/568.19, 123/568.11, 184.47, 184.52; 701/108; 60/279
See application file for complete search history.

(56) References Cited

U.S. PATENT DOCUMENTS 4,170,112 A * 10/1979 Bessho ........................... 60/278
5,181,491 A 1/1993 Izumi et al.
5,803,027 A 9/1998 Bell et al.
6,085,712 A * 7/2000 Ma ........................... 123/184.42
6,247,462 B1 6/2001 Wild et al.
2008/0125953 A1 5/2008 Bauer et al.

FOREIGN PATENT DOCUMENTS

| | | |
|---|---|---|
| DE | 19622891 | 12/1997 |
| DE | 199900729 | 7/2000 |
| DE | 102005009104 | 8/2006 |
| EP | 0223378 | 5/1987 |
| EP | 1241336 | 9/2002 |
| GB | 2301147 | 11/1996 |
| JP | 06081720 | 3/1994 |

OTHER PUBLICATIONS

English abstract for JP-06081720.
English abstract provided for DE-19622891.
English abstract for EP-1241336.

* cited by examiner

*Primary Examiner* — Mahmoud Gimie
(74) *Attorney, Agent, or Firm* — Rader, Fishman & Grauer PLLC

(57) ABSTRACT

The invention relates to an internal combustion engine system, especially in a motor vehicle, comprising an internal combustion engine, a make-up gas installation for supplying make-up gas to the internal combustion engine, an exhaust gas installation for evacuating the exhaust gas from the internal combustion engine, and an exhaust gas recirculation installation for extracting exhaust gas from the exhaust gas installation and introducing the extracted exhaust gas into the make-up gas installation. In order to improve the exhaust gas recirculation, two make-up gas paths through which make-up gas can flow in parallel are formed in a control section of the make-up gas installation, a make-up gas valve being arranged in each make-up gas path, for controlling the cross-section of the respective path through which gas can flow.

20 Claims, 1 Drawing Sheet

INTERNAL COMBUSTION ENGINE SYSTEM

CROSS-REFERENCES TO RELATED APPLICATION

This application is a continuation of International Application No. PCT/EP2008/052097 filed Feb. 21, 2008, which claims priority based on German Patent Application No. 102007009353.7, filed Feb. 23, 2007.

TECHNICAL FIELD

The present invention relates to an internal combustion engine system, in particular in a motor vehicle.

BACKGROUND

Such an internal combustion engine system conventionally comprises an internal combustion engine, for example a diesel engine or a gasoline engine, a make-up gas installation for supplying make-up gas to the internal combustion engine as well as an exhaust gas installation for evacuating exhaust gas from the internal combustion engine. To reduce pollutant emissions, it is customary to provide an exhaust gas recirculation installation with which exhaust gas can be extracted from the exhaust gas installation and introduced into the make-up gas installation. In order to be able to drive the exhaust gas to be extracted from the exhaust gas installation to the make-up gas installation, a corresponding loss in pressure is required. Under certain operating conditions of the internal combustion engine and in particular in the instance of a loaded internal combustion engine, the pressure difference between exhaust gas installation and make-up gas installation is comparably minimal resulting in the fact that it can be problematic to realise the respectively desired amount of exhaust gas to be extracted.

The present invention is concerned with the problem of providing an improved configuration of the internal combustion engine of the previously mentioned type that is characterised by an improved exhaust gas recirculation, in particular, and namely, preferably in internal combustion engines having comparably large volume flow rates.

According to the invention, this problem is solved by the subject matter of the independent claim. Advantageous embodiments are the subject matter of the dependent claims.

SUMMARY

The invention is based on the general concept of designing in the make-up gas installation at least two make-up gas paths through which make-up gas can flow in parallel, said make-up gas paths each being controllable by means of a make-up gas valve per individual make-up gas path. By means of such make-up gas valves, the cross section, through which gas can flow, of the make-up gas installation can be varied in a targeted manner, which is useful in the operation of the internal combustion engine, for example, for generating a decrease in pressure downstream from the make-up gas valve. The reduction in pressure increases the pressure difference between the exhaust gas installation and the make-up gas installation, thereby improving the recirculation of exhaust. It is of particular importance that at least two make-up gas paths are provided through which gas can flow in parallel and that are each controllable by means of a make-up gas valve. The cross section to be controlled can, by means of each of the make-up gas valves, thereby be comparably minimally selected. This can considerably simplify the realisation of each of the make-up gas valves. For example, a smaller valve member can be used that exhibits smaller torques of inertia. At the same time, a corresponding drive for the valve member is simplified; the wear and tear that arises is likewise reduced, while the sealing of the valve member within the respective make-up gas paths is simplified. By means of this manner of construction, is it thus particularly possible in large volume internal combustion engines, which require a relatively large volume rate of glow of make-up gas, to control the exhaust gas recirculation by means of make-up gas valves in the make-up gas installation, the make-up gas valves required therefor being comparably economical to realise. Larger internal combustion engines are used, for example, in commercial vehicles.

An embodiment that is particularly advantageous is one in which a valve control is provided that actuates the make-up gas valve as a function of the current operational state of the internal combustion engine in order to regulate a respectively suitable exhaust gas recirculation amount or exhaust gas recirculation rate. This valve control can preferably be designed in such a manner that under a small load and/or at a lesser engine speed, the one make-up gas valve is permanently held misaligned in its closed position and the other make-up gas valve actuates in order to regulate the respective exhaust gas recirculation amount. With a median load and/or median engine speed, it can be provided that the valve control actuates both of the make-up gas valves to synchronously or asynchronously regulate the respective exhaust gas recirculation amounts. Furthermore, it can be provided that the valve control with larger loads and/or greater engine speed holds the one make-up gas valve misaligned in its open position and the other make-up gas valve actuates in order to regulate the respective exhaust gas recirculation amount. Owing to the possibility of being able to control the at least two make-up gas valves independently from one another, the exhaust gas recirculation amount can be better or more precisely adjusted to the current requirement, which has a positive effect on the exhaust gas values of the internal combustion engine system.

In a further, important embodiment, it can be provided that the exhaust gas recirculation installation is connected to the make-up gas installation by means of at least two different introduction locations, said introduction locations being positioned in such a manner that fluctuations in pressure that can be generated with the one make-up gas valve, generate a greater exhaust gas recirculation amount through the one inlet position than through the other inlet position, while pressure fluctuations that can be generated with the other make-up gas valve generate a greater exhaust gas recirculation amount through the other inlet position than through one inlet position. With this manner of construction, it is additionally possible to vary the exhaust gas recirculation amount. In particular, according to one embodiment, it can be provided that a make-up gas valve is controlled to generate pressure fluctuations while the other make-up gas valve is permanently held in the closed position or misaligned in the open position. To realise median exhaust gas recirculation amounts, the one make-up gas valve can be permanently held misaligned in the closed position or in the open position or in a different position, while the other make-up gas valve is actuated to generate pressure fluctuations. To realise greater exhaust gas recirculation amounts, it can be provided that both of the make-up gas valves are synchronously activated to generate pressure fluctuations. With this particular operating mode, the different positionings of the inlet positions can be specifically utilised to generate different exhaust gas recirculation amounts through controlling the different make-up gas valves. It is notable that the adjustment of the different exhaust gas recirculation amounts is comparably economically realisable since the hardware needed therefor, namely at least one additional inlet position, is comparably economical.

Additional important features and advantages of the invention can be found in the dependent claims, in the drawings, and in the pertinent description of the figures with reference to the drawings.

It is understood that the features described above and those to be described in what follows can be used not only in the particular cited combination; but also in other combinations or independently without departing from the scope of the present invention.

Preferred embodiments of the invention are shown in the drawings and are described in more detail in the following description, the same reference numerals referring to components which are the same or functionally the same or similar.

BRIEF DESCRIPTION OF THE DRAWING

It is shown, schematically, in

DETAILED DESCRIPTION

Figure 1:
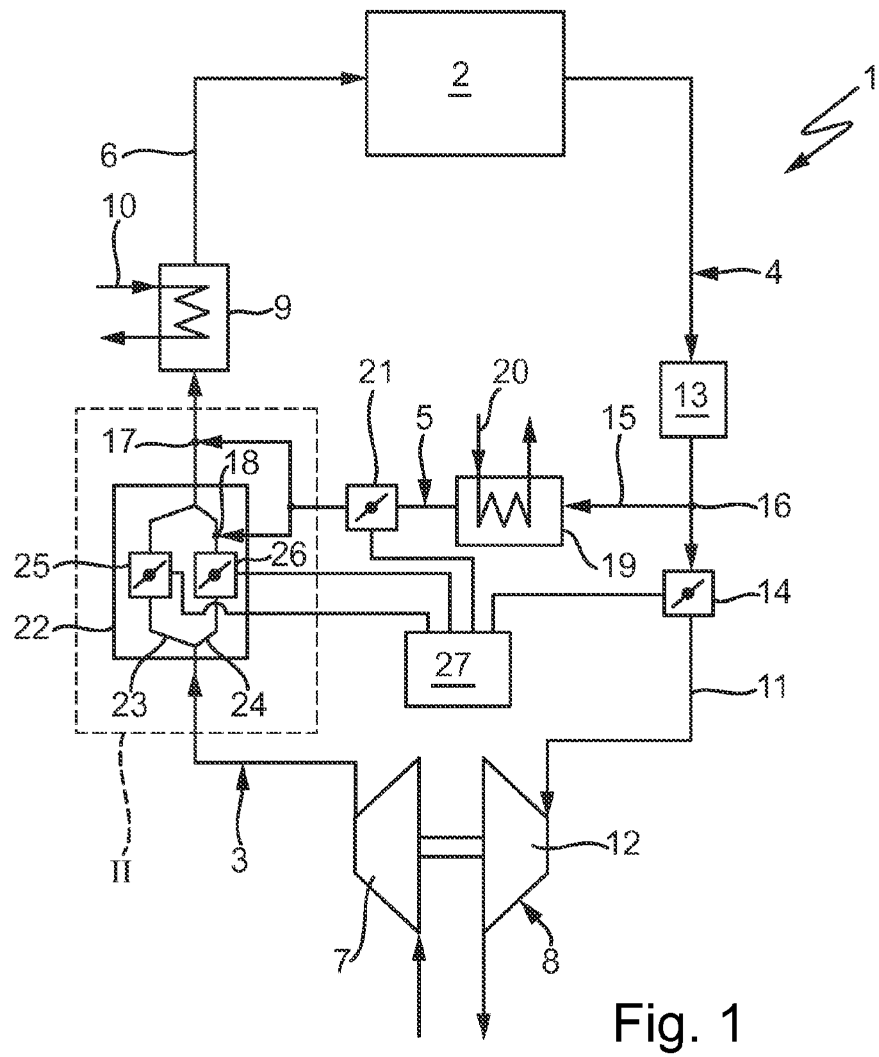
FIG. 1 a greatly simplified, principle representation, in the manner of a circuit diagram, of an internal combustion engine system, FIG. 2 an enlarged detail II from FIG. 1.

Corresponding to FIG. 1, an internal combustion engine system 1, that is preferably arranged in a motor vehicle, comprises an internal combustion engine 2, a make-up gas installation 3, an exhaust gas installation 4, as well as an exhaust gas recirculation installation 5. The internal combustion engine 2 relates to a conventional internal combustion engine such as, for example, a diesel engine, a gasoline engine or a natural gas engine, that, during operation, burns a fuel with make-up gas, thereby generating exhaust gas.

The make-up gas installation 3 serves to supply make-up gas to the internal combustion engine 2. For this purpose, the make-up gas installation 3 has a make-up gas line 6 that is conventionally connected to the internal combustion engine 2 by means of a make-up gas distributor, which is not explained in greater detail herein, arranged on the inlet side of the internal combustion engine 2. In so far as a charged internal combustion engine 2 is concerned, as is the case here, a charging device 7 is arranged in the make-up gas installation 3 in order to achieve an increase in pressure in the make-up gas. This charging device 7 is preferably a compressor 7 of an exhaust gas turbo charger 8 or any other type of charging device 7 whatsoever. In so far as such a charging device 7 is provided, a heat exchanger 9 can additionally be incorporated in the make-up gas installation 3 downstream from said charging device, said heat exchanger serving to cool the charged make-up gas and customarily being considered a charged air cooler. The heat exchanger 9 can thus be incorporated in a cooling circuit 10 in which it can preferably be a matter of the cooling circuit of the internal combustion engine 2.

The exhaust gas installation 4 serves to evacuate exhaust gas from the internal combustion engine 2 and for this purpose has an exhaust gas line 11 that is conventionally connected to the internal combustion engine 2 by means of an exhaust gas collector, which is not explained in greater detail herein, arranged on the outlet side of the internal combustion engine 2. In the present case, the exhaust gas installation 4 contains a turbine 12 of the exhaust gas turbo charger 8 for driving the compressor 7. The exhaust gas installation 4 can optionally contain at least one component 13 for treating exhaust gas. This component 13 can be, for example, an oxidation catalyst, a particle filter, a $NO_x$ storage catalyst, an SCR catalyst or any combination thereof whatsoever. It is preferably a particle filter 13. The exhaust gas installation 4 can additionally or optionally comprise an exhaust gas valve 14 that is designed in such a manner that a cross section, which can be flowed through, of the exhaust gas installation 4 or of the exhaust gas line 11 can be controlled therewith.

The exhaust gas recirculation installation 5 serves to extract exhaust gas from the exhaust gas installation 4 and to introduce the extracted exhaust gas into the make-up gas installation 3. For this purpose, the exhaust gas recirculation installation 5 comprises an exhaust gas recirculation line 15 that is connected to the exhaust gas installation 4 by means of an extraction location 16 and is furthermore connected to the make-up gas installation 3 by means of at least one introduction location 17, 18. In the preferred example shown in FIG. 1, two such introduction locations 17, 18 are represented. In a different embodiment, one sole introduction location 17, 18 is sufficient; in yet further embodiments, more than two introduction locations 17, 18 can be provided. The exhaust gas recirculation installation 5 can have a heat exchanger 19 by means of which the exhaust gas to be recirculated can be cooled. For this purpose, the heat exchanger 19, which can also be characterized as an exhaust gas recirculation cooler, is connected to a cooling circuit 20, which can also particularly likewise be the cooling circuit of the internal combustion engine 2. The exhaust gas recirculation installation 5 can additionally or optionally contain a recirculation valve 21 that is advantageously designed in such a manner that a back flowing of make-up gas into the exhaust gas installation 4 by way of the exhaust gas recirculation installation 5 can be prevented. In a simple embodiment, the recirculation valve 21 can be a passively functioning non return blocking valve. In yet a further different embodiment, it can be an actively or controllable recirculation valve 21 by means of which the cross section, through which gas can flow, of the exhaust gas recirculation installation 5 or of the recirculation line 15 is controllable.

The make-up gas installation 3 comprises a control section 22 in which the make-up gas installation 3 has at least two parallel make-up gas paths, through which gas can flow, namely a first make-up gas path 23 and a second make-up gas path 24. In theory, more than two make-up gas paths 23, 24 can be provided. A make-up gas valve is arranged in at least two make-up gas paths 23, 24, preferably in each make-up gas path 23, 24. Accordingly, a first make-up gas valve 25 is arranged in the first make-up gas path 23, while a second make-up gas valve 26 is arranged in the second make-up gas path 24. Each make-up gas valve 25, 26, is designed in such a manner that a cross section, through which gas can flow, of the each of the make-up gas paths 23, 24 can be controlled. For example, each make-up gas valve 25, 26 can realize a closed position and an open position for the respective make-up gas path 23, 24. In the closed position, the respective make-up gas path 23, 24 is blocked or opened with a cross section through which gas can flow only minimally, while the respective make-up gas path 23, 24 in the open position of the corresponding make-up gas valve 25, 26 is fully open or exhibits its cross section through which gas can maximally flow. The control section 22 is arranged in the make-up gas installation 3 upstream from the make-up gas distributor, the control section 22 being arranged in particular upstream from the heat exchanger 9 in the make-up gas installation 3.

A valve control 27 is preferably provided for actuating the make-up gas valve 25, 26, said valve control being connected to the make-up gas valves 25, 26 in a suitable manner. The valve control 27 can moreover be connected to the exhaust gas valve 14 and/or to the recirculation valve 21, in so far as these valves are controllable or present. Furthermore, the valve control 27 can be coupled with the internal combustion engine 2 or with an engine control in a suitable manner. For example, the valve control 27 can be integrated in such an engine control. Regardless, the valve control 27 is coupled with the engine control in such a manner that the valve control 27 recognises the current operational state of the internal combustion engine 2 or recognises the exhaust gas recirculation amount from the current operational state of the internal combustion engine 2.

The pressure reduction between the extraction location 16 and the respective introduction location 17, 18 is the driving force for the recirculation of exhaust gas from the exhaust gas installation 4 into the make-up gas installation 3. In the embodiment shown with a charged internal combustion engine 2, a high pressure recirculation system is show in which the extraction location 16 is located on the high pressure side of the turbine 12, while the introduction locations 17, 18 are located on the high pressure side of the compressor 7. In theory, low pressure-high pressure recirculation systems are also conceivable, in which exhaust gas is extracted on the low pressure side of the turbine 12 and is introduced on the high pressure side of the compressor 7. Pure low pressure recirculation systems are likewise conceivable. Depending on the specific operational state of the internal combustion engine 2, which is substantially determined by the load and engine speed parameters, the pressure in the make-up gas downstream from the compressor 7 can be similarly as high as in the exhaust gas upstream from the turbine 12. In order to be able to realise the respectively desired exhaust gas recirculation amount in such operating states, the valve control 27 can drive the make-up gas valves 25, 26 to reduce the cross section through which gas can flow, thereby bringing about a drop in pressure downstream from the make-up gas valves 25, 26. In so far as the introduction locations 17, 18 are arranged in the make-up gas installation 3, the pressure reduction, which can be generated by the make-up gas valves 25, 26, leads to an increased in the pressure difference between the extraction location 16 and the introduction locations 17, 18, which in turn improves the recirculation of the exhaust gas.

In an advantageous embodiment, it can be provided that the valve control 27 is designed in such a manner that it drives the make-up gas valves 25, 26 to generate pressure fluctuations in the make-up gas installation 3. These pressure fluctuations exhibit vibrational phases with relatively low pressures, which make it possible to generate comparably great pressure differences between the extraction location 16 and the introduction locations 17, 18. In this manner, the make-up gas valves 25, 26 can theoretically be driven in such a manner that pressure fluctuations, which develop regardless in the make-up gas installation 3 owing to the charge change processes, can be increased in a controlled manner.

In the embodiment shown here, both of the introduction locations 17, 18 are arranged downstream from make-up gas valves 25, 26 in the make-up gas installation 3. Theoretically, it is however also possible to arrange at least one of the introduction locations 17, 18 downstream from the make-up gas valves 25, 26 in the make-up gas installation 3. In so far as the make-up gas valves 25, 26 are drivable in a correspondingly dynamic fashion, pressure differentiations can also be generated in the make-up gas upstream from the make-up gas valves 25, 26, which pressure differentiations have vibrational phases with comparably low pressure that is sufficient for a recirculation of exhaust gas. Accordingly, the make-up gas flow 28 indicated by arrows in FIG. 2 can be directed in the opposite direction in a different embodiment.

An embodiment is particularly advantageous in which the make-up gas valves 25, 26 are designed so as to be dynamically driven. In this manner, it is particularly possible to actuate the make-up gas valves 25, 26 as a function of the dynamically changing operational state of the internal combustion engine 2 in order to adapt the exhaust gas recirculation rate or the exhaust gas recirculation amount to the dynamically changing requirement by means of the dynamic control of the make-up gas pressure at the introduction locations 17, 18. The make-up gas valves 25, 26 can, in particular, be dynamically actuated as a function of the engine speed and/or the load of the internal combustion engine 2.

The make-up gas valves 25, 26 can preferably be designed as fast switching valves that realise within relatively short switching times or control times the desired changes of the cross section, through which gas can flow, of each of the make-up gas paths 23, 24 of the make-up gas installation 3. For example, the make-up gas valves 25, 26 can be shifted in the millisecond range between their closed position and their open position. In particular, the rapid switching make-up gas valves 25, 26 can be switched in the same frequency range in which the charge change processes of the internal combustion engine 2 also take place. In this manner, a synchronisation of the make-up gas valves 25, 26 is adjustable to the pressure fluctuations in the make-up gas that occur regardless owing to the charge change processes, for example. For example, positive and negative pressure amplitudes in the vibrating make-up gas flow can be increased in a targeted manner.

The make-up gas valves 25, 26 can be designed as discontinuously-working valves in which a valve member, for example a butterfly damper, with opposing directions of motion is switchable between at least two pre-determined control positions. Without limiting generality, such a discontinuously working make-up gas valve 25, 26 have as a valve member a damper that is pivotable about an axis of rotation, for example, that is switchable between a closed position and an open position. The respective valve member rotates upon closing in one rotation direction and rotates upon opening in the other direction of rotation. Furthermore, a discontinuously working valve is characterised by the fact that the respective valve member remains in the respectively set control position for a certain time so that the valve member is in motion for only a temporally limited, rapidly occurring switching processes.

Alternatively, the make-up gas valves 25, 26 can also be continuously working valves in which the respective valve member runs through at least two different control positions with the direction of motion. Without limiting generality, the continuously working make-up gas valve 25, 26 can have, for example, a damper or a rotary slide valve that is rotatably drivable about an axis of rotation. It is characteristic for the continuously working make-up gas valve 25, 26 that during operation of the valve, the respective valve member permanently rotates in the same direction of rotation and travels with a predetermined rotational speed through, for example a dwell angle region and an opening angle range. By means of such continuously working make-up gas valves 25, 26, extremely short switching times can also be achieved, however it being possible for a cross section change to occur permanently and the respective valve member being permanently in motion. By varying the rate of rotation, the switching times can also be adjusted with such a continuously working make-up gas valve 25, 26.

A method for operating the internal combustion engine system 1 can proceed as follows:

In order to set different exhaust gas recirculation amounts, the valve control 27 can control the make-up gas valves 25, 26 to generate pressure fluctuations in which the frequency and/or the amplitude is a function of each of the respective exhaust gas recirculation amounts. According to a preferred embodiment, the valve control 27 can be designed in such a manner that during an operational state of the internal combustion engine 2 that is characterised by a range of smaller loads and/or lesser engine speeds, it permanently holds the first exhaust gas valve 25 in its closed position, while it drives the second exhaust gas valve 26 to set the respective exhaust gas recirculation amount. In this operational state, the first make-up gas path 23 is permanently blocked, while the pressure fluctuations are generated only in the second make-up gas path 24.

To realise the respective exhaust gas recirculation amounts during an operation state of the internal combustion engine 2, said operation state being characterised by a range of median loads and/or median engine speeds, the valve control 27 can additionally or alternatively be designed in such a manner that it drives synchronously or asynchronously both of the make-up gas valves 25, 26 to set the respective exhaust gas recirculation amount.

It can additionally or alternatively be provided that the valve control 27 is designed in such a manner that during an operational state of the internal combustion engine 2 that is characterised by a range of larger loads and/or greater engine speeds, it holds permanently open one of the make-up gas valves 25, 26, while it drives the other make-up gas valve 25, 26 to set the respective exhaust gas recirculation amount. Preferably, The make-up gas valves 25, 26 are thus drivable independently of one another by means of the valve control 27, by means of which additionally possibilities arise for setting the exhaust gas recirculation amounts.

Figure 2:
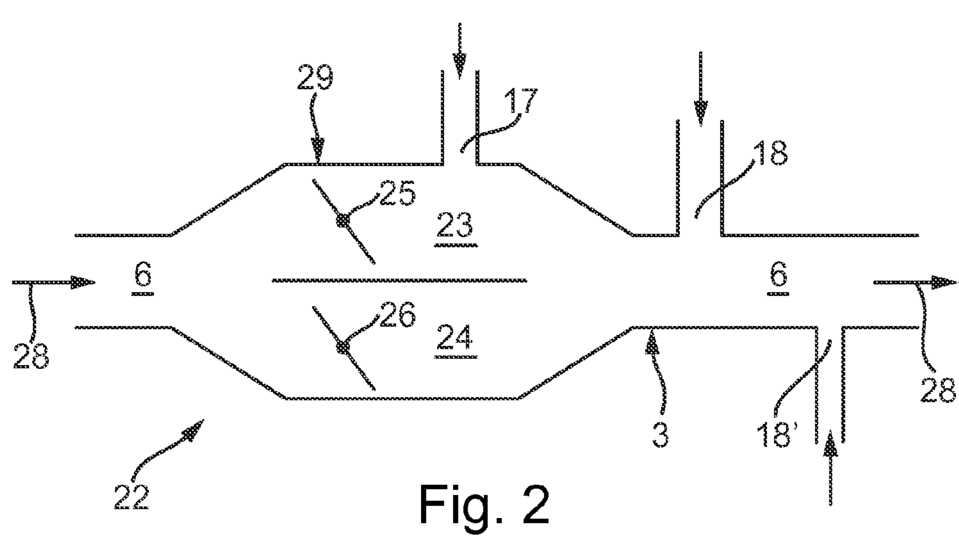

Corresponding to FIG. 2, the control section 22 can preferably be designed in a valve housing 29. Both of the make-up gas paths 23 and 24, through which gas can flow in parallel, are designed in this valve housing 29. Both of the make-up gas valves 25, 26 are respectively arranged in one of the make-up gas paths 23, 24 in the valve housing 29. The valve housing 29 is integrated in the make-up gas line 6 and thereby forms a component of the make-up gas installation 3. By way of example, one of the introduction locations 17, 18 is designed on the valve housing 29 and thus is directly connected to one of the make-up gas paths 23, 24. For example, what is concerned here is the introduction location 17, which is designated with 17, that is also designated in the following as a first introduction location 17. The other introduction location 18, which is also designated as a second introduction location 18 in the following, can in theory likewise be designed on the valve housing 29. Preferably, the second introduction location 18 is, however, connected on a different position on the make-up gas installation 3. FIG. 2 reproduces two alternative possibilities for positioning the second introduction location 18. For example, the second introduction location 18 is located directly downstream from the control section 22. In an alternative embodiment, the second introduction location 18' can, for example, be located somewhat farther downstream from the control section 22. The introduction locations 17, 18 are positioned differently on the exhaust gas system 3 in such a manner that the actuations of the first make-up gas valve 25 has a different effect on the first introduction location 17 than it does on the second introduction location 18, and that actuations of the second make-up gas valve 26 have a different effect on the first introduction location 17 than on the second introduction location 18. For example, the introduction locations 17, 18 can be positioned in such a manner that pressure fluctuations, which can be generated with the first make-up gas valve 25, generate a greater exhaust gas recirculation amount through the first introduction location 17 than through the second introduction location 18, 18'. Furthermore, pressure fluctuations, which are generated with the second make-up gas valve 26, generate a greater exhaust gas recirculation amount through the second introduction location 18, 18' than through the first introduction location 17. Such an embodiment is based on the recognition that pressure fluctuations, as a function of the position of the introduction location 17, 18, have a different effect on the exhaust gas recirculation amount that can be realised through the respective introduction locations 17, 18. By means of a targeted selection of the positioning for the introduction locations 17, 18, a plethora of adjustment possibilities for the exhaust gas recirculation amount thus result. In particular, it is thereby possible to arrange or position the introduction locations 17, 18 in such a manner that during a stationary or constant operation of the internal combustion engine 2, an exhaust gas recirculation amount, which can be introduced through the first introduction location 17 by means of pressure fluctuations that are generated by actuating the first make-up gas valve 25, is lesser than an exhaust gas recirculation amount that is generated owing to pressure fluctuations that are generated with the second make-up gas valve 26 and that can be introduced through the second introduction location 18. To realise this differing exhaust gas recirculation amounts or to increase this effect, it can be provided to design the introduction locations 17, 18 differently with regard to exhaust gas recirculation amounts that can be introduced therethrough into the make-up gas installation 3. For example, the introduction locations 17, 18, as exemplarily represented in FIG. 2, can have different flow cross sections. Additionally or alternatively, it can be provided that the cross section, through which gas can flow, of both of the make-up gas paths 23, 24 are designed differently.

By means of the targeted positioning of the introduction locations 17, 18, a certain allocation of the make-up gas valves 25, 26 to the introduction locations 17, 18 can be realised. In a corresponding configuration of the valve control 27, different exhaust gas recirculation amounts can be adjusted by driving the make-up gas valves 25, 26 differently. For example, in order to adjust a region of small exhaust gas recirculation amounts, it can be provided to drive the second make-up gas valve 26 in order to generate pressure fluctuations and to hold the first make-up gas valve 25 permanently displaced in the closed position or in the open position or in a different position. The stationary positioning of the first make-up gas valve 25 can be a function of the current operational state of the internal combustion engine 2. In order to adjust a region of median exhaust gas recirculation amounts, the second make-up gas valve 26 can now be held permanently displaced in the closed position of in the open position or in another position, while the first make-up gas valve 25 is driven to generate the pressure fluctuations. In this instance as well, the respective stationary position of the second make-up gas valve 26 can be a function of the current operating state of the internal combustion engine 2. In order to realise a range of large exhaust gas recirculation amounts, it can be provided to drive both of the make-up gas valves 25, 26 synchronously or asynchronously in order to generate the pressure fluctuations.

In the present connection, the terms "small", "median", and "large" do not suggest absolute values for the exhaust gas recirculation amounts or for the load and/or engine speed of the internal combustion engine 2, but rather suggest only relative values. This means merely that what is intended to be expressed is that small exhaust gas recirculation amounts, small loads, and small engine speeds are smaller than median exhaust gas recirculation amounts, median loads, and median engine speeds, while large exhaust gas recirculation amounts, large loads, and large engine speeds are larger than median exhaust gas recirculation amounts, median loads, and median engine speeds. For example, in an entire range the minimal value of which is 0% and the maximum value of which is 100%, small values are in a partial range of approximately 0% to 50% of the entire range, median values are in a partial range of approximately 25% to 75% of the entire range, and large values are in a partial range of approximately 50% to 100% of the entire range.

In theory, the valve control 27 can drive in a targeted fashion the exhaust gas valve 14 in such a manner that a pressure increase arises in the exhaust gas installation 4 in the region of the evacuation location 16 that is preferably located between the component 13 and the exhaust gas valve 14. In particular, the exhaust gas valve 14 can be driven in such a manner that impulse-like pressure surges having a predetermined frequency are thereby generated in the exhaust gas recirculation installation 5. These pressure impulses can be specifically designed in such a manner that a predetermined exhaust gas recirculation amount can thereby be realised. Additionally or alternatively, the recirculation valve 21 can be used in order to increase the pressure impulses that are generated by the exhaust gas valve 14 or to generate such pressure impulses, should the exhaust gas valve 14 not be driven to generate pressure impulses. The controllable recirculation valve 21 can likewise be driven in such a manner so as to prevent make-up gas from erroneously flowing into the exhaust gas installation 4 by way of the recirculation installation 5. Moreover, it is possible, in particular, to actuate the controllable, that is to say active recirculation valve 21 to control the pressure impulse that is generated by means of the exhaust gas valve 14, in order to permit pressure impulses to be fully or only partially admitted. In contrast to a passively working non-return blocking valve, the drivable recirculation valve 21 can control a considerably larger cross section through which gas can flow, which in turn correspondingly reduces the current flow resistance.

The invention claimed is:

1. An internal combustion engine system, comprising:
- an internal combustion engine,
- a make-up gas installation for supplying make-up gas to the internal combustion engine wherein the make-up gas installation includes a control section,
- an exhaust gas installation for evacuating exhaust gas from the internal combustion engine,
- an exhaust gas recirculation installation for extracting exhaust gas from the exhaust gas installation and introducing the extracted exhaust gas into the make-up gas installation,
- at least two make-up gas paths through which gas can flow in parallel that are formed in the control section of the make-up gas installation,
- a make-up gas valve for each of the at least two make-up gas paths, wherein the make-up gas valve controls a cross section through which gas flows of the respective make-up gas path and controls an exhaust gas recirculation rate of the exhaust gas recirculation installation, wherein the make-up gas valve is arranged in the at least two make-up gas paths, and wherein the make-up gas valves are fast switching valves, and
- a valve control provided for actuating the make-up gas valves, said valve control driving during operation of the internal combustion engine the make-up gas valves to generate pressure fluctuations in the make-up gas installation,
- wherein said pressure fluctuations with regard to at least one of frequency and amplitude are a function of an exhaust gas recirculation amount to be adjusted, so as to adjust the exhaust gas recirculation amount as a function of an current operational state of the internal combustion engine.

2. The internal combustion engine system as specified in claim 1, wherein at least one of the following is selected:
- i. the valve control is designed such that during the operational state of the internal combustion engine with at least one of a smallest relative load and smallest relative engine speed, the valve control holds at least one of the make-up gas valves permanently misaligned in a closed position and drives the at least one other make-up gas valve to adjust the respective exhaust gas recirculation amount,
- ii. the valve control is designed such that during the operational state of the internal combustion engine with at least one of a median relative load and median relative engine speed, the valve control drives the at least two make-up gas valves one of synchronously and asynchronously to adjust the respective exhaust gas recirculation amounts, and
- iii. the valve control is designed such that during an operational state of the internal combustion engine with at least one of a largest relative load and largest relative engine speed, the valve control holds at least one of the make-up gas valves permanently misaligned in an open position and drives the at least one other make-up gas valve to adjust the respective exhaust gas recirculation amount.

3. The internal combustion engine system as specified in claim 1 wherein the exhaust gas recirculation installation is connected to the make-up gas installation by means of at least two different introduction locations, wherein the introduction locations are positioned such that a greater exhaust gas recirculation amount is generated with the pressure fluctuations generated by the at least one make-up gas valve by means of the at least one introduction location than by means of the least one other make-up gas valve, while a greater exhaust gas recirculation amount is generated with the pressure fluctuations generated by the at least other make-up gas valve by means of the at least one other introduction location than generated by means of the at least one introduction location.

4. The internal combustion engine system as specified in claim 3, wherein the introduction locations are positioned in such that with a substantially identical operational state of the internal combustion engine, the exhaust gas recirculation amount, conducted through the at least one introduction location owing to the pressure fluctuations generated by the at least one make-up gas valve, is smaller than the exhaust gas recirculation amount, conducted through the at least one other introduction location owing to the pressure fluctuations generated by the at least one other make-up gas valve.

5. The internal combustion engine system as specified in claim 3, wherein at least one of the following is selected:
- i. the valve control is designed such that the valve control drives the at least one make-up gas valve to generate pressure fluctuations and holds the other make-up gas valve permanently misaligned in one of a closed position an open position, and another position; and
- ii. the valve control is designed such that the valve control holds the at least one make-up gas valve permanently misaligned in one of the closed position, the open position, and another position to adjust a median exhaust gas recirculation amount and wherein the valve control drives the at least one other make-up gas valve to generate pressure fluctuations, and iii. the valve control is designed such that to adjust a largest exhaust gas recirculation amount, the valve control drives the at least two make-up gas valves one of synchronously and asynchronously to generate pressure fluctuations.

6. The internal combustion engine system as specified in claim 3, wherein the at least two introduction locations are designed differently with respect to exhaust gas recirculation amounts guided therethrough into the make-up gas installation.

7. The internal combustion engine system as specified in claim 1, wherein the control section is in a valve housing that contains the at least two make-up gas paths with the make-up gas valves.

8. The internal combustion engine system as specified in claim l, wherein at least one of the following is selected:

i. the exhaust gas recirculation installation is connected to the make-up gas installation by means of at least one introduction location, said introduction location being arranged downstream from the respective make-up gas valve in the make-up gas installation; and ii. the exhaust gas recirculation installation is connected to the make-up gas installation by means of the at least one introduction location, said introduction location being arranged upstream from the respective make-up gas valve in the make-up gas installation.

9. The internal combustion engine system as specified claim 1 wherein the at least two make-up gas paths are designed differently with regard to the cross section through which gas can flow.

10. The internal combustion engine system as specified in claim 1 wherein at least one of the following is selected:

i. the make-up gas valves are configured to be driven dynamically;

ii. the make-up gas valves are fast switching valves; and iii. the make-up gas valves are one of:

a. discontinuously working valves, the respective valve member of which having opposing directions of motion is switchable at least between two predetermined control positions; and b. said make-up gas valves are continuously working valves, the respective valve member of which with an identical direction of motion moves through at least two different control positions.

11. The internal combustion engine system as specified in claim 2, wherein the exhaust gas recirculation installation is connected to the make-up gas installation by means of at least two different introduction locations, wherein the introduction locations are positioned such that a greater exhaust gas recirculation amount is generated with the pressure fluctuations generated by the at least one make-up gas valve by means of the at least one introduction location than by means of the least one other make-up gas valve, while a greater exhaust gas recirculation amount is generated with the pressure fluctuations generated by the at least other make-up gas valve by means of the at least one other introduction location than generated by means of the at least one introduction location.

12. The internal combustion engine system as specified in claim 11, wherein the introduction locations are positioned in such that with a substantially identical operational state of the internal combustion engine, the exhaust gas recirculation amount, conducted through the at least one introduction location owing to the pressure fluctuations generated by the at least one make-up gas valve, is smaller than the exhaust gas recirculation amount, conducted through the at least one other introduction location owing to the pressure fluctuations generated by the at least one other make-up gas valve.

13. The internal combustion engine system as specified in claim 2, wherein the control section is in a valve housing that contains the at least two make-up gas paths with the make-up gas valves.

14. The internal combustion engine system as specified in claim 2, wherein at least one of the following is selected:

i. the exhaust gas recirculation installation is connected to the make-up gas installation by means of at least one introduction location, said introduction location being arranged downstream from the respective make-up gas valve in the make-up gas installation; and ii. the exhaust gas recirculation installation is connected to the make-up gas installation by means of the at least one introduction location, said introduction location being arranged upstream from the respective make-up gas valve in the make-up gas installation.

15. The internal combustion engine system as specified claim 2, wherein the at least two make-up gas paths are designed differently with regard to the cross section through which gas flows.

16. The internal combustion engine system as specified in claim 2, wherein at least one of the following is selected:

i. the make-up gas valves are configured to be driven dynamically;

ii. the make-up gas valves are fast switching valves; and iii. the make-up gas valves are one of:

a. discontinuously working valves, the respective valve member of which having opposing directions of motion is switchable at least between two predetermined control positions; and b. said make-up gas valves are continuously working valves, the respective valve member of which with an identical direction of motion moves through at least two different control positions.

17. The internal combustion engine system as specified in claims 3, wherein the control section is in a valve housing that contains the at least two make-up gas paths with the make-up gas valves.

18. The internal combustion engine system as specified in claim 4, wherein at least one of the following is selected:

i. the valve control is designed such that the valve control drives the at least one make-up gas valve to generate pressure fluctuations and holds the other make-up gas valve permanently misaligned in one of a closed position an open position, and another position; and ii. the valve control is designed such that the valve control holds the at least one make-up gas valve permanently misaligned in one of the closed position, the open position, and another position to adjust a median exhaust gas recirculation amount and wherein the valve control drives the at least one other make-up gas valve to generate pressure fluctuations, and iii. the valve control is designed such that to adjust the largest exhaust gas recirculation amount, the valve control drives the at least two make-up gas valves one of synchronously and asynchronously to generate pressure fluctuations.

19. The internal combustion engine system as specified in claim 4, wherein the at least two introduction locations are designed differently with respect to exhaust gas recirculation amounts guided therethrough into the make-up gas installation.

20. The internal combustion engine system as specified in claims 4, wherein the control section is in a valve housing that contains the at least two make-up gas paths with the make-up gas valves.

* * * * *